United States Patent
Kim et al.

(10) Patent No.: US 7,807,767 B2
(45) Date of Patent: Oct. 5, 2010

(54) METHOD FOR PRODUCING ACRYL SYRUP BY BULK POLYMERIZATION

(75) Inventors: No-ma Kim, Daejeon (KR); Jae-gwan Lee, Daejeon (KR); Suk-ky Chang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 51 days.

(21) Appl. No.: 12/232,459

(22) Filed: Sep. 17, 2008

(65) Prior Publication Data

US 2009/0018259 A1    Jan. 15, 2009

Related U.S. Application Data

(63) Continuation of application No. 11/268,734, filed on Nov. 8, 2005.

(30) Foreign Application Priority Data

Nov. 8, 2004    (KR) ............... 10-2004-0090368

(51) Int. Cl.
 *C08F 12/00* (2006.01)
(52) U.S. Cl. ............... 526/318; 526/319; 526/222; 526/224; 526/329
(58) Field of Classification Search ............... 526/318, 526/319, 222, 224, 329
See application file for complete search history.

(56) References Cited

U.S. PATENT DOCUMENTS

| 4,287,317 A * | 9/1981 | Kitagawa et al. ............ 525/309 |
| 5,599,883 A | 2/1997 | Ohsugi et al. |
| 6,399,731 B2 | 6/2002 | King et al. |
| 6,448,330 B1 | 9/2002 | Inoue et al. |
| 6,602,333 B2 | 8/2003 | Miyabayashi |
| 6,759,473 B1 * | 7/2004 | Nakamura et al. .......... 524/503 |
| 2003/0183106 A1 | 10/2003 | Watanabe |

FOREIGN PATENT DOCUMENTS

| JP | 40-3701 | 2/1940 |
| JP | 64-11652 | 1/1989 |
| JP | 9-67495 | 2/1989 |
| JP | 11-255828 | 9/1999 |
| JP | 2000159816 | 6/2000 |
| JP | 2000-313704 | 11/2000 |
| JP | 200131709 | 6/2001 |

* cited by examiner

*Primary Examiner*—David Wu
*Assistant Examiner*—Michael M Bernshteyn
(74) *Attorney, Agent, or Firm*—McKenna Long & Aldridge LLP

(57) ABSTRACT

The present invention provides a method for producing acryl syrup by bulk polymerization, comprising a step of preparing a mixture comprising monomer component and 2,4-diphenyl-4methyl-1-pentene; a step of heating the mixture to the initial reaction temperature; and a step of adding an polymerization initiator having the half-life of not more than 30 minutes at 5-80° C., wherein the initial reaction temperature is controlled so that the polymerization initiator has the half-life of up to 30 minutes. The method of the present invention has such advantages that reaction runaway does not occur, the control of molecular weight and conversion rate is possible even at low exothermic temperature, and a partially polymerized acryl syrup can also be prepared therefrom.

6 Claims, No Drawings

METHOD FOR PRODUCING ACRYL SYRUP BY BULK POLYMERIZATION

This application is a continuation application of U.S. patent application Ser. No. 11/268,734 filed on Nov. 8, 2005 and claims the priority of Korean Patent Application No. 10-2004-0090368 filed on Nov. 8, 2004, the disclosure of which are expressly incorporated by reference herein.

TECHNICAL FIELD

The present invention relates to a method for producing acryl syrup by bulk polymerization. More precisely, the present invention relates to a method for producing acryl syrup, by which it is possible to produce a high-molecular weight acryl syrup while preventing reaction runaway and stirring failure, and to easily control molecular weight and conversion rate.

BACKGROUND ART

The acryl syrup has been used as an intermediate raw-material for a (meth)acryl resin substrate, optical materials such as an optical transmission fiber or an optical waveguide, artificial marbles, floor materials, adhesives and medical supplies.

The acryl syrup can be produced by bulk polymerization, solution polymerization, emulsion polymerization, suspension polymerization and photo polymerization. However, solution polymerization, emulsion polymerization and suspension polymerization have many disadvantages in that the methods require too much energy in order to remove reaction residues. In addition, it is difficult to obtain a product exhibiting high functionality, and the load to environment is high. For these reasons, it is a tendency to produce acryl syrup by bulk polymerization or photo polymerization, which is carried out in the absence of solvents.

However, in carrying out bulk polymerization or photo polymerization, heat transfer is difficult, since the polymerization is carried out without solvents. Furthermore, in case the polymerization is carried out in a general batch reactor, runaway reaction is easy to occur, since the reactor temperature is very difficult to control. Also, the termination of production of radicals is reduced due to a rapid increase in viscosity resulting from an increase in conversion rate. Thus, a phenomenon such as the partial formation of gel occurs, and non-uniform resin with wide range of molecular weight is liable to be obtained.

In order to overcome the above problems, the attempt to use a semi-batch, continuous or plug flow reactor in place of the batch reactor has been reported. Japanese patent laid-open publication Nos. S40-003701, H11-255828 and 2000-159816 disclose a method, in which polymerization is carried out under high temperature by using a continuous polymerization method.

However, the polymerization in those reactors has a problem in that it has a high economic burden, since not only the reactor itself but also the cost of utilities is expensive. Another problem is that it is unfavorable for the production of small amounts of many different species, although it is suitable for the production of large amounts of a few species.

In an attempt to solve these problems, a method is known that polymerization carries out in the batch reactor under the mild conditions. This is a method where the temperature of a reaction system is maintained at a constant level while forcibly terminating polymerization when the conversion or viscosity of the reaction system reaches a given level. Regarding the method for the termination of polymerization, Japanese patent laid-open publication No. H01-11652 discloses the termination of polymerization by the addition of a polymerization inhibitor, and Japanese patent laid-open publication No. H09-67495 discloses polymerization termination, such as quenching by the addition of monomers.

However, this polymerization method cannot become a fundamental solution, because it has shortcomings to cause a great increase in viscosity at the latter half of reaction, shows a difference in physical properties depending on the completion time of reaction, and results in polymer syrup with poor storage stability because a polymerization initiator remains in the syrup.

In an attempt to solve these problems, there have been many solutions where a batch reactor is used but runaway reaction does not occur and the molecular weight of syrup is easily controlled.

First, there are examples where bulk polymerization is carried out without using a polymerization initiator.

Japanese patent laid-open publication No. 2001-31709 discloses a method, in which the bulk polymerization is carried out by using a compound having a thiol group and a secondary hydroxyl group with a compound having a secondary hydroxyl group and not having a thiol group. Also, Japanese patent laid-open publication No. 2001-302705 discloses a method, in which the bulk polymerization is carried out by using a compound having a thiol group and a carboxyl group.

However, in the above polymerization methods, the residue of thiol groups in syrup deteriorates the physical properties of products, such as storage stability.

Japanese patent laid-open publication No. 2000-313704 discloses a method synthesizing acryl syrup having the conversion rate of 10-50%, in which 0.0001-0.5 parts by weight of an polymerization initiator having a 10-hr half-life at the temperature of less than 41° C. is used, the self-heat generation at reaction temperature of 20-80° C. is used, and the peak exothermic temperature of reactants reaches a range of 100-140° C. This polymerization method is based on the idea that the rapid increase in the concentration of radicals at the initial stage of reaction, resulted from the addition of an initiator which used to be decomposed at low temperature at a relatively high reaction temperature, causes the rapid increase of reaction speed, and as a result, the reactor temperature is increased, the half-life of the initiator drops rapidly and finally the depletion of initiator occurs resulting in stopping of reaction.

However, from the thorough examination, the present inventors concluded that this method needs a proper amount of an initiator to obtain a satisfactory result, which suggests a problem of high exothermic temperature. Thus, a highly sensitive cooling system is required during scale-up, nevertheless there is still a possibility of runaway reaction. In addition, the method which has the peak exothermic temperature of reactants ranging 100-140° C. is not applicable to low boiling point monomers such as ethyl acrylate (boiling point=99° C.) and butyl acrylate (boiling point=145° C.). Also, there is a problem of rapid spontaneous thermo polymerization by a high temperature, unless the reactor is not rapidly cooled down at such high temperature. In the meantime, in production of high molecular weight acryl syrup having more than a million of molecular weight, the conversion rate should be maintained as low as possible, because of the steep increase in viscosity, but the method described in Japanese patent laid-open publication No. 2000-313704 is carried out without lowering the conversion rate, meaning that it has problems of unstable stirring and formation of gel due to the rapid increase of viscosity to produce a syrup having more than a million of molecular weight.

DISCLOSURE OF INVENTION

It is an object of the present invention, to overcome the above problems, to provide a method for producing acryl syrup at an industrial scale, in which runaway reaction does not occur, it is easy to control molecular weight and conversion rate, and it is possible to form a high molecular weight acryl syrup.

In general, a thiol-based chain transfer agent is used to regulate molecular weight in the production of acryl syrup. The use of the thiol-based chain transfer agent enables easy control of molecular weight, but makes the control of reaction speed difficult.

Therefore, it is also an object of the present invention to provide a more stable method for producing acryl syrup, in which molecular weight and reaction speed are regulated by using 2,4-diphenyl-4-methyl-1-pentene singly or together with a thiol chain transfer agent and spontaneous thermopolymerization is also effectively inhibited at high temperatures.

To achieve the above objects, the present invention provides a method for producing acryl syrup by bulk polymerization, comprising a step of preparing a mixture comprising monomer component and 2,4-diphenyl-4-methyl-1-pentene; a step of heating the mixture to the initial reaction temperature; and a step of adding an polymerization initiator having the half-life of not more than 30 minutes at 5-80° C. to the mixture, wherein the initial reaction temperature is controlled so that the polymerization initiator has the half-life of not more than 30 minutes.

The present invention is described in detail hereinafter.

In the present invention, the bulk polymerization can be carried out in a batch reactor.

The monomer component used herein is not specifically limited. In the present invention, any conventional monomer component to prepare acryl syrup can be used.

For example, the monomer component can comprise alkyl (meth)acrylate as a main component. The alkyl(meth)acrylate usable herein comprises, but is not limited thereto, (meth) acrylic acid methyl, (meth)acrylic acid ethyl, (meth)acrylic acid propyl, (meth)acrylic acid butyl, (meth)acrylic acid pentyl, (meth)acrylic acid hexyl, (meth)acrylic acid 2-ethyl hexyl, (meth)acrylic acid octyl, (meth)acrylic acid nonyl, (meth)acrylic acid decyl and (meth)acrylic acid dodecyl.

In the present invention, the monomer component can comprise the alkyl (meth)acrylate in an amount of 0.1-100 weight part, and more preferably the monomer component can comprise the alkyl(meth)acrylate in an amount of 1-100 weight part, relative to total weight of the monomer component.

In the present invention, the monomer component can further comprise other conventional monomers, which are used to produce acryl syrup. The monomers usable herein comprise, but are not limited thereto, acrylic acid aryl ester such as acrylic acid phenyl and acrylic acid benzyl; acrylic acid alkoxy alkyl such as acrylic acid methoxy ethyl, acrylic acid ethoxy methyl, acrylic acid propoxy ethyl, acrylic acid butoxy ethyl, acrylic acid ethoxy propyl; acrylic acid and acrylic acid alkali metal salt; methacrylic acid and methacrylic acid alkali metal salt; methacrylic acid aryl ester such as methacrylic acid phenyl and methacrylic acid benzyl; methacrylic acid alkoxy alkyl such as methacrylic acid methoxy ethyl, methacrylic acid ethoxy methyl, methacrylic acid propoxy ethyl, methacrylic acid butoxy ethyl, methacrylic acid ethoxy propyl; (poly)alkylene glycol diacrylic acid ester such as ethylene glycol diacrylic acid ester, diethylene glycol diacrylic acid ester, triethylene glycol diacrylic acid ester, polyestylene glycol diacrylic acid ester, propylene glycol diacrylic acid ester; (poly)alkylene glycol dimethacrylic acid ester such as ethylene glycol dimethacrylic acid ester, diethylene glycol dimethacrylic acid ester, triethylene glycol dimethacrylic acid ester, polyestylene glycol dimethacrylic acid ester, propylene glycol dimethacrylic acid ester; multivalent acrylic acid ester such as trimethylpropane triacrylic acid ester; multivalent methacrylic acid ester such as trimethylpropane trimethacrylic acid ester; acrylonitrile; methacrylonitrile; vinyl acetate; vinylidene chloride; vinyl halide compound such as acrylic acid 2-chloroethyl and methacrylic acid 2-chloroethyl; cyclic alcohol acrylic acid ester such as acrylic acid cyclohexyl; cyclic alcohol methacrylic acid ester such as methacrylic acid cyclohexyl; polymerized compound containing oxazoline group such as 2-vinyl-2-oxazoline, 2-vinyl-5-methyl-2-oxazoline and 2-isoprophenyl-2-oxazoline; polymerized compound containing agitation lysine such as acryoyl agitation lysine, methacryoyl agitation lysine, acrylic acid-2-aziridinyl ethyl and methacrylic acid-2-aziridinyl ethyl; polymerized compound containing epoxy such as aryl glycidyl ether, acrylic acid glycidyl ether, methacrylic acid glycidyl ether, acrylic acid 2-ethyl glycidyl ether and methacrylic acid 2-ethyl glycidyl ether; vinyl compound containing hydroxyl group such as acrylic acid 2-hydroxyethyl, acrylic acid 2-hydroxypropyl, acrylic acid 2-hydroxybutyl, methacrylic acid 2-hydroxyethyl, acrylic acid or methacrylic acid, polypropylene glycol or polyestylene glycol monoester and additives of the mixture of lactones and (meth)acrylic acid; vinyl monomer containing fluorine such as fluorine-substituted methacrylic acid alkyl ester and fluorine-substituted acrylic acid alkyl ester; unsaturated carbonic acid such as itaconic acid except (meth)acrylic acid, crotonic acid, maleic acid and fumaric acid or their salts; ester compound and acid anhydride; vinyl monomer containing reactive halogen such as 2-chloro ethyl vinyl ether and monochloro vinyl acetate; vinyl monomer containing amide group such as methacryl amide, N-methylol methacryl amide, N-methoxy ethyl methacryl amide and N-butoxy methyl methacryl amide; vinyl monomer containing amine group such as N-vinyl pyrrolidone and N-vinyl caprolactam; vinyl monomer containing silicone such as vinyl trimethoxy silane, y-methacryloxy propyl trimethoxy silane, aryl trimethoxy silane, trimethoxy silyl propyl allyl amine and 2-methoxy ethoxy trimethoxy silane; styrene and macro monomers having radical polymerized vinyl group at the end of monomer polymerized with vinyl group.

In the present invention, the 2,4-diphenyl-4-methyl-1-pentene (α-methyl styrene dimer, AMSD) can be used independently or together with a thiol chain transfer agent. The single use of a conventional thiol chain transfer agent in the polymerization causes rapid increase of peak exothermic temperature owing to the excessive reactivity.

The thiol chain transfer agent can be selected among organic compounds having thiol group (—SH), but the selection is not limited thereto. For example, it is possible to use one of alkyl mercaptans including ethyl mercaptan, butyl mercaptan, hexyl mercaptan and dodecyl mercaptan; thiophenols including phenyl mercaptan and benzyl mercaptan; mercaptans containing carboxyl group such as thioglycolic acid, 3-mercapto propionic acid and thiosalicylic acid; mercaptans containing hydroxyl group such as 2-mercapto ethanol and 3-mercapto-1,2-propanediol; and mercaptans containing two or more functional groups like the above such as pentaerythritol tertrakis(3-mercapto)propionate, and the like.

In the present invention, the mixture can comprises 2,4-diphenyl-4-methyl-1-pentene in an amount of 0.001-5.0 weight part, more preferably 0.001-1.0 weight part or further more preferably 0.001-0.5 weight part, relative to 100 weight part of the monomer component. If the amount of 2,4-diphenyl-4-methyl-1-pentene is less than 0.001 weight part, it is apprehended that the control of heating value in the polymerization is difficult. If the amount of 2,4-diphenyl-4-methyl-1-pentene is more than 5.0 weight part, it is apprehended that the reaction speed is reduced, and thus the conversion rate is deteriorated.

In the present invention, it is also possible to use a thiol chain transfer agent together with 2,4-diphenyl-4-methyl-1-pentene. In this case, the thiol chain transfer agent can be used in an amount of 0.00001-5 weight part relative to 100 weight part of the monomer component. If the amount of the thiol chain transfer agent is less than 0.00001 weight part, it is apprehended that polymerization proceeds rapidly progress and at the same time, uniform mixing in a reactor is not made, and the molecular weight of the resulting polymer increase excessively. If it is more than 5 weight part, it is apprehended that polymerization rate becomes slow and molecular weight is excessively reduced, resulting in deterioration in the physical properties of a final product.

In the present invention, after preparing the mixture comprising the above component, the mixture can be heated to the initial reaction temperature. At this time, the initial reaction temperature can be controlled so that the polymerization initiator, which is added to initiate the bulk polymerization, has the half-life of not more than 30 minutes. In one embodiment, the initial reaction temperature can be 5-80° C., or more preferably 55-80° C.

In the present invention, the heating step can be carried out after preparing the mixture comprising the monomer component and 2,4-diphenyl-4-methyl-1-pentene, or after adding the polymerization initiator to the mixture.

In the present invention, the bulk polymerization can be initiated by adding an polymerization initiator to the mixture of the monomer component and 2,4-diphenyl-4-methyl-1-pentene. The polymerization initiator used in the present invention is not specifically limited if it has the half-life of not more than 30 minutes at 5-80° C., and is exemplified by azo initiator such as 2,2-azobis-4-methoxy-2,4-dimethylvaleronitrile (Wako V-70), 2,2-azobis-2,4-dimethylvaleronitrile (Wako V-65), 2,2-azobis-isobutyronitrile (Wako V-60) and 2,2-azobis-2-methyl-butyronitrile (Wako V-59); isobutyryl peroxide (NOF, Peroyl IB), bisneodecanoyl peroxy diisopropyl benzene (NOF, Percumyl BF), cumyl peroxy neodecanoate (NOF, Percumyl ND), dipropyl peroxy dicarbonate (NOF, Peroyl NPP), diisopropyl peroxy dicarbonate (NOF, Peroyl IPP), tetramethyl butyl peroxy neodecanate (NOF, Perocta ND), bis-4-butylcyclohexyl peroxy dicarbonate (NOF, Peroyl TCP), diethoxyethyl peroxy dicarbonate (NOF, Peroyl EEP), diethoxyhexylperoxydicarbonate (NOF, Peroyl OPP), hexyl peroxy dicarbonate (NOF, Perhexyl ND), dimethoxybutyl peroxy dicarbonate (NOF, Peroyl MBP), bis(3-methoxy-3methoxybutyl)peroxy dicarbonate (NOF, Peroyl SOP), butyl peroxy neodecanoate (NOF, Perbutyl ND), hexyl peroxy pivalate (NOF, Perhexyl PV), butyl peroxy pivalate (NOF, Perbutyl), trimethylhexanoyl peroxide (NOF, Peroyl 355), dimethyl hydroxybutyl peroxy neodecanoate (Atofina, Luperox 610M75), amyl peroxy neodecanoate (Atofina, Luperox 546M75), butyl peroxy neodecanoate (Atofina, Luperox 10M75), amyl peroxy pivalate (Atofina, Luperox 546M75), and the like.

In one embodiment, the initiator can be added to the mixture in an amount of 0.0001-0.5 weight part relative to 100 weight part of the monomer component. Particularly, the amount of 0.001-0.3 weight part is more preferred and the amount of 0.001-0.1 weight part is most preferred. If the amount of the initiator is less than 0.0001 weight part, it is apprehended that the initiation efficiency decreases and the reaction is not completed satisfactorily. If the amount of the initiator is 0.5 weight part or more, it is apprehended that the control of polymerization temperature is difficult.

If the polymerization reaction of the invention meets the above conditions, the initiator is decomposed and the reaction is terminated with peak exothermic temperature of less than 95° C. in about an hour from the start of polymerization.

Partially polymerized acryl syrup in which 5-50 weight % of the monomers are polymerized might be obtained by one time polymerization with a small amount of initiator. Also, it is possible to control the final conversion rate as about 98% or more, by repeating the above steps by adding an additional initiator more than once, and regulating the conversion rate of each polymerization step.

In the present invention, a polymerization inhibitor may also be used. The polymerization inhibitor is not specifically limited if it is a compound capable of absorbing radicals to terminate radical reaction, for example, hydroquinone or 4-methoxyphenol, and the like.

In the preferred embodiment of the present invention, it is preferred to perform polymerization with stirring and substitution with inert gas like nitrogen is required before reaction starts.

BEST MODES FOR CARRYING OUT THE INVENTION

Hereinafter, preferred examples will be presented for a better understanding of the present invention. It is to be understood, however, that theses examples are given for illustrative purpose only and are not construed to limit the scope of the present invention.

The physical properties of the acryl syrup synthesized by the inventive method are evaluated in the following manner.

1. Measurement of Solid Concentration

The concentration of solids in the syrup is measured by dropping about 0.1-1.3 g of the syrup onto a previously weighed aluminum dish, measuring the weight of the resulting dish, drying the syrup in an oven at 130° C. for 1 hour, and then, measuring the weight of the dried dish.

2. Measurement of Viscosity

The viscosity of the syrup is measured with a Brookfield viscometer.

3. Measurement of Molecular Weight

Upon completion of the reaction, the acryl syrup was dried at high temperature, and weight average molecular weight was measured by using gel permeation chromatography as follows.

(1) Analytical Instrument
Manufacturer: Waters Alliance System
Column: PL Mixed B type
Analyzer: Refractive index detector
(2) Analytical Condition
Flow rate: 1 ml/min
Moving phase solvent: Tetra hydro furane
Column temperature: 40° C.
Sample concentration: 1 mg/ml
Sample amount: 200 µl

EXAMPLE 1

Into a 3-liter four neck glass reactor equipped with a nitrogen gas inlet tube, a stirrer, a temperature sensor, a condenser and an outside cooling jacket was added 1880 g of acrylic acid 2-ethyl hexyl, 120 g of acrylic acid, 1 g of 2,4-diphenyl-4- methyl-1-pentene and 0.002 g of n-dodecyl mercaptan. The mixture was heated to the reaction temperature of 78° C. while removing dissolved oxygen with nitrogen stream for 30 minutes. Then, 0.012 g of 2,2-azobis-4-methoxy-2,4-dimethylvaleronitrile (Wako, V-70) was added to initiate polymerization reaction. Temperature in the reaction was elevated to the peak exothermic temperature of 83° C. only within about 2 minutes, and then three minutes later, lowered to the reaction temperature set prior to the initiation of the reaction. After that, an increase in the viscosity of the reaction solution did not occur and after one hour, the reaction solution was cooled down at room temperature, resulting in the termination of the reaction.

The concentration of solids in the partially polymerized syrup thus obtained was 6%, and the syrup had a viscosity of 200 centipoise (cP) and a molecular weight of 220,000.

EXAMPLE 2

Into the same reactor as used in the above Example 1 was added 1880 g of acrylic acid 2-ethyl hexyl, 120 g of acrylic acid, 0.4 g of 2,4-diphenyl-4-methyl-1-pentene and 0.002 g of n-dodecyl mercaptan. The mixture was heated to the reaction temperature of 67° C. while removing dissolved oxygen with nitrogen stream for 30 minutes. Then, 0.04 g of 2,2-azobis-4-methoxy-2,4-dimethylvaleronitrile (Wako, V-70) was added to initiate reaction. Temperature in the reaction was elevated to the peak exothermic temperature of 72° C. within about 15 minutes, and then 20 minutes later, lowered to the reaction temperature set prior to the initiation of the reaction. Then, 0.04 g of the same initiator as used in the above was added to repeat the reaction. Temperature in the reaction was elevated to the peak exothermic temperature of 77° C. within about 15 minutes, and then 20 minutes later, lowered to the reaction temperature set prior to the initiation of the reaction. The reaction solution stood for 30 minutes at the initial reaction temperature, followed by cooling with cooling water at room temperature to terminate the reaction.

The concentration of solids in the partially polymerized syrup thus obtained was 24.2%, and the syrup had a viscosity of 6600 centipoise (cP) and a molecular weight of 550,000.

EXAMPLE 3

Into the same reactor as used in the above Example 1 was added 1880 g of acrylic acid 2-ethyl hexyl, 120 g of acrylic acid, 0.2 g of 2,4-diphenyl-4-methyl-1-pentene and 0.001 g of n-dodecyl mercaptan. The mixture was heated to the reaction temperature of 57° C. while removing dissolved oxygen with nitrogen stream for 30 minutes. Then, 0.02 g of 2,2-azobis-4-methoxy-2,4-dimethylvaleronitrile (Wako, V-70) was added to initiate reaction. Temperature in the reaction was elevated to the peak exothermic temperature of 63° C. within about 20 minutes, and then 25 minutes later, lowered to the reaction temperature set prior to the initiation of the reaction. Then, 0.02 g of the same initiator as used in the above was added to repeat the reaction. Temperature in the reaction was elevated to the peak exothermic temperature of 66° C. within about 20 minutes, and then 20 minutes later, lowered to the reaction temperature set prior to the initiation of the reaction. The reaction solution stood for 30 minutes at the initial reaction temperature, followed by cooling with cooling water at room temperature to terminate the reaction.

The concentration of solids in the partially polymerized syrup thus obtained was 22.6%, and the syrup had a viscosity of 29000 centipoise (cP) and a molecular weight of 1,200,000.

EXAMPLE 4

Into the same reactor as used in the above Example 1 was added 1880 g of acrylic acid 2-ethyl hexyl, 120 g of acrylic acid, 0.34 g of 2,4-diphenyl-4-methyl-1-pentene and 0.4 g of n-dodecyl mercaptan. The mixture was heated to the reaction temperature of 57° C. while removing dissolved oxygen with nitrogen stream for 30 minutes. Then, 0.18 g of 2,2-azobis-4-methoxy-2,4-dimethylvaleronitrile (Wako, V-70) was added to initiate reaction. Temperature in the reaction was elevated to the peak exothermic temperature of 76° C. within about 15 minutes, and then 20 minutes later, lowered to the reaction temperature set prior to the initiation of the reaction. The reaction solution stood for 30 minutes at the initial reaction temperature, followed by cooling with cooling water at room temperature to terminate the reaction.

The concentration of solids in the partially polymerized syrup thus obtained was 32.1%, and the syrup had a viscosity of 2000 centipoise (cP) and a molecular weight of 250,000.

EXAMPLE 5

Into the same reactor as used in the above Example 1 was added 1880 g of acrylic acid 2-ethyl hexyl, 120 g of acrylic acid, 1.6 g of 2,4-diphenyl-4-methyl-1-pentene and 0.001 g of n-dodecyl mercaptan. Then, 0.06 g of ethyl hexyl peroxy dicarbonate was added as an initiator to initiate reaction at 82° C. Temperature in the reaction was elevated to the peak exothermic temperature of 89° C. within about 12 minutes, and then 30 minutes later, lowered to the reaction temperature set prior to the initiation of the reaction. Then, 0.06 g of the same initiator as used in the above was added to repeat the reaction. Temperature in the reaction was elevated to the peak exothermic temperature of 88° C. within about 10 minutes, and then 28 minutes later, lowered to the reaction temperature set prior to the initiation of the reaction. The reaction solution stood for 30 minutes at the initial reaction temperature, followed by cooling with cooling water at room temperature to terminate the reaction.

The concentration of solids in the partially polymerized syrup thus obtained was 38.0%, and the syrup had a viscosity of 4500 centipoise (cP) and a molecular weight of 300,000.

COMPARATIVE EXAMPLE 1

Reaction was performed in the same manner as described in Example 4 except that 2,4-diphenyl-4-methyl-1-pentene was not used. The reactor was equipped with a separate stainless cooling coil to circulate coolant, together with reactor jacket, at the same temperature as the initial reaction temperature. After the addition of an initiator, the temperature in the reaction was elevated to the peak exothermic temperature of 145° C. within 4 minutes, and 50 minutes later, lowered to the reaction temperature set prior to the initiation of the reaction.

The concentration of solids in the partially polymerized syrup thus obtained was 55.0%, and the syrup had a viscosity of 30,000 centipoise (cP) and a molecular weight of 390,000.

COMPARATIVE EXAMPLE 2

Reaction was performed in the same manner as described in Example 4 except that 2,4-diphenyl-4-methyl-1-pentene was not used. At that time, the reactor was not equipped with a separate stainless cooling coil. After the addition of an initiator, the temperature in the reaction was elevated to the peak exothermic temperature of 155° C. within 4 minutes and the temperature was maintained by thermo polymerization.

To lower the temperature, 10% of the initially used monomer was added, resulting in the decrease of reaction temperature to around 100° C. The temperature of reaction system was maintained over 90° C. 50 minutes later, stirring was almost impossible, so the reaction was forcibly terminated.

The concentration of solids in the partially polymerized syrup thus obtained was 67.0%, and the syrup had a viscosity of 90,000 centipoise (cP) and a molecular weight of 590,000.

COMPARATIVE EXAMPLE 3

Reaction was performed in the same manner as described in Example 3 except that 0.001 g of n-dodecyl mercaptan was used instead of 2,4-diphenyl-4-methyl-1-pentene. Temperature in the reaction was elevated to the peak exothermic temperature of 105° C. within three minutes, and maintained for 20 minutes. Then, stirring became impossible, so the reaction was forcibly terminated.

The concentration of solids in the partially polymerized syrup thus obtained was 38.0%, and the syrup had a viscosity of 100,000 centipoise (cP) and a molecular weight of 1,000,000.

INDUSTRIAL APPLICABILITY

The present invention provides a method for producing an acryl syrup in which reaction runaway in bulk polymerization does not occur, it is possible to regulate conversion rate and molecular weight stably even at low exothermic temperature without stirring failure and it is also possible to produce a partially polymerized acryl syrup.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:

1. A method for producing acryl syrup, comprising:
a step of preparing a mixture comprising a monomer component and 2,4-diphenyl-4-methyl-1-pentene for bulk polymerization;
a step of heating the mixture to an initial reaction temperature; and
a step of initiating the bulk polymerization so as to produce the acryl syrup by adding a polymerization initiator having the half-life of not more than 30 minutes at 5-80° C. to the mixture,
wherein the bulk polymerization is carried out in a batch reactor,
wherein the initial reaction temperature is controlled so that the polymerization initiator has the half-life of not more than 30 minutes,
wherein the temperature in the batch reactor is changed in such a way that the temperature is increased from the initial reaction temperature to a peak exothermic temperature of less than 95° C., and then decreased from the peak exothermic temperature to the initial temperature,
wherein, the polymerization initiator controls the change of the temperature and terminates the bulk polymerization in the batch reactor by being decomposed and substantially depleted in the batch reactor.

2. The method for producing acryl syrup according to the claim 1,
wherein the molecular weight of the acryl syrup is 220,000 to 1,200,000.

3. The method for producing acryl syrup according to the claim 1,
wherein the monomer component comprises alkyl (meth) acrylate.

4. The method for producing acryl syrup according to the claim 1,
wherein the mixture comprises 2,4-diphenyl-4-methyl-1-pentene in an amount of 0.001-5.0 weight part relative to 100 weight part of the monomer component.

5. The method for producing acryl syrup according to the claim 1,
wherein the polymerization initiator is added in an amount of 0.0001-0.5 weight part relative to 100 weight part of the monomer component.

6. The method for producing acryl syrup according to the claim 1,
wherein the mixture further comprises a thiol chain transfer agent in an amount of 0.00001-5.0 weight part relative to 100 weight part of the monomer component.

* * * * *